United States Patent [19]
Sato et al.

[11] Patent Number: 5,736,677
[45] Date of Patent: Apr. 7, 1998

[54] SILENCER-EQUIPPED GROMMET AND STRUCTURE FOR MOUNTING THE GROMMET

[75] Inventors: Hidetoshi Sato; Shinichi Akiyama, both of Shizuoka, Japan

[73] Assignee: Yazaki Corporation, Tokyo, Japan

[21] Appl. No.: 759,671

[22] Filed: Dec. 6, 1996

[30] Foreign Application Priority Data

Dec. 6, 1995 [JP] Japan .................................. 7-318156

[51] Int. Cl.$^6$ .................................................. H02G 3/18
[52] U.S. Cl. .................. 174/65 G; 174/135; 174/152 G; 277/178
[58] Field of Search ........................... 174/153 G, 151, 174/152 G, 65 G, 65 SS, 135; 248/56; 16/2.1, 2.2; D8/356; 277/178, 188 R

[56] References Cited

U.S. PATENT DOCUMENTS

| | | | |
|---|---|---|---|
| 3,695,386 | 10/1972 | Thien et al. | 181/33 K |
| 4,097,096 | 6/1978 | Kochendorfer | 174/153 G X |
| 4,378,672 | 4/1983 | Lassiter | 57/122 |
| 4,797,513 | 1/1989 | Ono et al. | 174/153 G |
| 4,884,251 | 11/1989 | Moxness | 367/188 |
| 5,270,487 | 12/1993 | Sawamura | 174/65 G X |
| 5,579,663 | 12/1996 | Likich et al. | 74/502.5 |

FOREIGN PATENT DOCUMENTS

| | | | |
|---|---|---|---|
| 5622718 | 7/1954 | Japan . | |
| 54-23954 | 2/1979 | Japan | F16J 15/52 |
| 55-79618 | 6/1980 | Japan | H02G 3/22 |
| 57-15626 | 1/1982 | Japan | H02G 3/22 |
| 57-56413 | 12/1982 | Japan | H01B 17/58 |
| 58-10261 | 2/1983 | Japan | H01B 17/58 |
| 58-150315 | 10/1983 | Japan | H02G 3/22 |
| 62-131316 | 8/1987 | Japan | H01B 17/58 |

*Primary Examiner*—Kristine L. Kincaid
*Assistant Examiner*—Dean A. Reichard
*Attorney, Agent, or Firm*—Sughrue, Mion, Zinn, Macpeak & Seas, PLLC

[57] ABSTRACT

A grommet which passes through and is held by a hole formed in a panel includes a grommet portion and a silencer. The grommet portion is made of an elastic material, and has a large diameter portion having a rib portion, a small diameter portion, and an opening penetrating the large diameter portion and the small diameter portion. The silencer includes a noise insulating portion made of a hard noise insulating material, a front end portion of the noise insulating portion being inserted into the grommet portion, a recess portion for engaging the rib portion formed on the noise insulating portion, and a noise absorbing portion made of a soft noise absorbing material. The noise insulating portion and the noise absorbing portion are integrally formed, and a wire insertion hole is formed so as to penetrate the noise insulating portion and the noise absorbing portion.

13 Claims, 3 Drawing Sheets

SILENCER-EQUIPPED GROMMET AND STRUCTURE FOR MOUNTING THE GROMMET

BACKGROUND OF THE INVENTION

1. Field of the Invention

This invention relates to a silencer-equipped grommet used for allowing a wire etc. to pass through and to be held by a panel etc. and used for preventing infiltration of noise through the panel.

2. Background

Engine noise infiltrates into a motor vehicle through various routes. Noise passing through the dash panel, among others, is most contributory. Therefore, a so-called acoustical insulation grommet has heretofore been used for a wire passing through the dash panel. It is known that the acoustical insulation grommet is required to have acoustical insulation performance and mountability.

As shown in FIG. 4, an acoustical insulation grommet disclosed in, e.g., Unexamined Japanese Utility Model Publication No. Sho. 56-22718 is constructed as follows. A cylindrical noise insulating member 3 is arranged inside a funnel-shaped main body 1, and a noise insulating plate 5 for preventing the coming off of the noise insulating member 3 from the main body 1 is mounted inside a large diameter portion 1a of the main body 1. The insulating member 3 is made of a hard material such as glass wool, the main body 1 is made of an elastic material such as rubber, and the noise insulating plate 5 is made of a soft material such as polyethylene resin.

The large diameter portion 1a of the main body 1 is engaged with a hole 9 of a panel 7. In the grommet 13, since the noise insulating plate 5 has been mounted on the main body 1, the noise insulating member 3 having a wire 11 passing therethrough is held inside the main body 1. Therefore, noise infiltrating into the inside of the motor vehicle through the hole 9 from the engine room side is insulated by the noise insulating member 3 and the noise insulating plate 5.

On the other hand, FIG. 5 shows an acoustical insulation grommet disclosed in Unexamined Japanese Utility Model Publication No. Sho. 57-15626 and constructed as follows. A noise insulating member 19 has a wire insertion hole 17, and is made of an elastic material. The noise insulating member 19 is elastically engaged with a funnel-shaped main body 15 made of an elastic material such as rubber. A radially extending slit 21 is formed in the noise insulating member 19. The slit 21 allows the wire insertion hole 17 to expand, so that excellent wire inserting operability can be provided.

The grommet 23 is formed by a smaller number of simply shaped parts. Therefore, the cost of manufacture is reduced, and further, noise from the engine room side can be insulated reliably since the noise insulating member 19 is brought into intimate contact with the inner surface of the main body 15 by compressive stress.

However, in the grommet 13 in FIG. 4, the noise insulating member 3 and the noise insulating plate 5 are separate pieces. Therefore, the noise insulating member 3 and the noise insulating plate 5 must be engaged with the main body 1 through two engaging operations, which in turn imposes the problem of poor operability. In addition, it is difficult to ensure a large force for holding between the main body 1 and the noise insulating plate 5 because large holding force impairs engaging operability. Therefore, the noise insulating plate 5 easily comes off. If the noise insulating plate 5 does come off, since there is no holding function between the main body 1 and the noise insulating member 3, the noise insulating member 3 may separate from the main body 1. Therefore, the noise insulating function is lost. Further, when the wire 11 is wrenched during transportation or the assembling to the motor vehicle, the wire 11 rubs against the corner 3a of the hard noise insulating member 3 since the soft noise insulating plate 5 is thin, which in turn imposes the problem of damaging the wire 11.

On the other hand, in the grommet 23 in FIG. 5, there is no holding function between the main body 15 and the noise insulating member 19. Since the noise insulating member 19 is held by the main body 15 through compressive stress, there exists the problem that the engaged conditions differ from one operator to another. When the wire 11 is wrenched, the noise insulating member 19 moves in such a direction as to separate from the main body 15. Therefore, the noise insulating member 19 is very likely to come off. Further, since the noise insulating member 19 is made of an elastic material in the grommet 23, the wire insertion hole 17 and the slit 21 can easily expand when the wire 11 is bent by an external force, thus allowing noise to infiltrate from such clearances and impairs the noise insulating function.

SUMMARY OF THE INVENTION

The present invention has been made in view of the aforementioned circumstances. The object of the invention is therefore to provide a silencer-equipped grommet that provides an easy engaging operation, prevents parts from coming off, and provides reliable noise insulation, so that operability, holding, and noise insulating can be improved.

To achieve the above object, the present invention is applied to a silencer-equipped grommet passing through and being held by a hole formed in a panel, the silencer-equipped grommet including a grommet portion made of an elastic material, the grommet portion having a large diameter portion having a rib portion and a small diameter portion, the grommet portion having an opening penetrating the large diameter portion and the small diameter portion, and a silencer including a noise insulating portion made of a hard noise insulating material, a front end portion of the noise insulating portion being inserted into the grommet portion, a recess portion, for engaging the rib portion, formed on the noise insulating portion, a noise absorbing portion made of a soft noise absorbing material, in which the noise insulating portion and the noise absorbing portion are integrally formed, and a wire insertion hole formed so as to penetrate the noise insulating portion and the noise absorbing portion.

Further, the silencer-equipped grommet is preferably such that a slit for expanding the wire insertion hole is formed along the total length of the silencer.

Further, in a structure for mounting the silencer-equipped grommet, in which the noise insulating portion of the silencer is inserted into the grommet portion, the grommet portion passes through and is held by the hole, and at the same time, the noise absorbing portion of the silencer projecting from the grommet portion is brought into contact with an insulator arranged in parallel with the panel.

In the thus constructed silencer-equipped grommet, since the noise insulating portion inserted into the grommet portion is made of a hard material, the grommet portion and the silencer can be engaged with each other reliably. Therefore, incomplete engagement is unlikely to occur during silencer engaging operation and holding force can be increased. In addition, the noise insulating portion made of a highly noise insulating material is inserted into the grommet portion, which in turn ensures excellent noise insulating performance at the through portion of a hole. Moreover, the noise absorbing portion that has excellent noise absorbing performance is arranged on the end portion of the noise insulating portion. Therefore, any noise having infiltrated from the noise insulating portion can be absorbed, which in turn reliably prevents the noise from infiltrating into the motor vehicle.

Further, since the slit that opens the wire insertion hole is formed in the silencer, the wire insertion hole of the silencer is made expandable.

Further, in the structure for mounting the silencer-equipped grommet of the invention, the noise absorbing portion made of a soft material is arranged so as to project from the grommet portion, so that the noise absorbing portion is brought into intimate contact with the insulator at the same time with the grommet portion passing through and being held by the panel.

DETAILED DESCRIPTION OF THE PREFERRED EMBODIMENT

Figure 1:
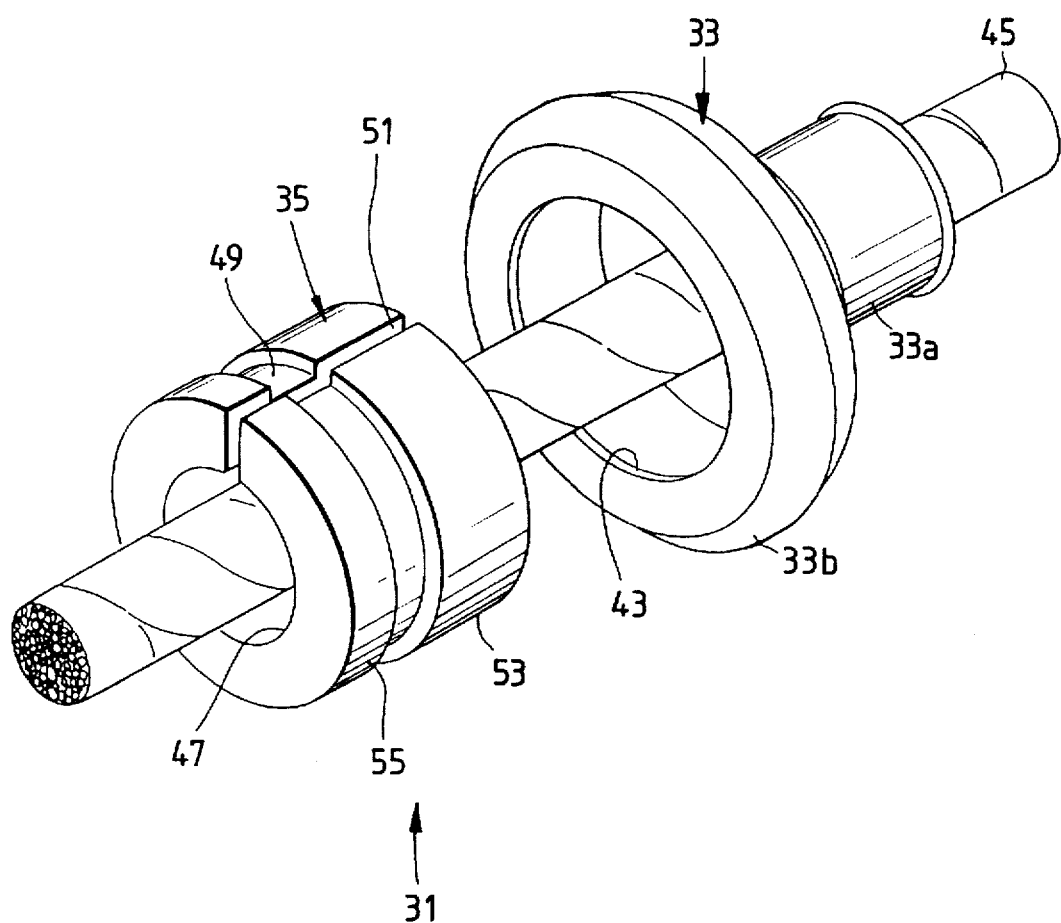
FIG. 1 is an exploded perspective view of a silencer-equipped grommet of the invention.
Figure 2:
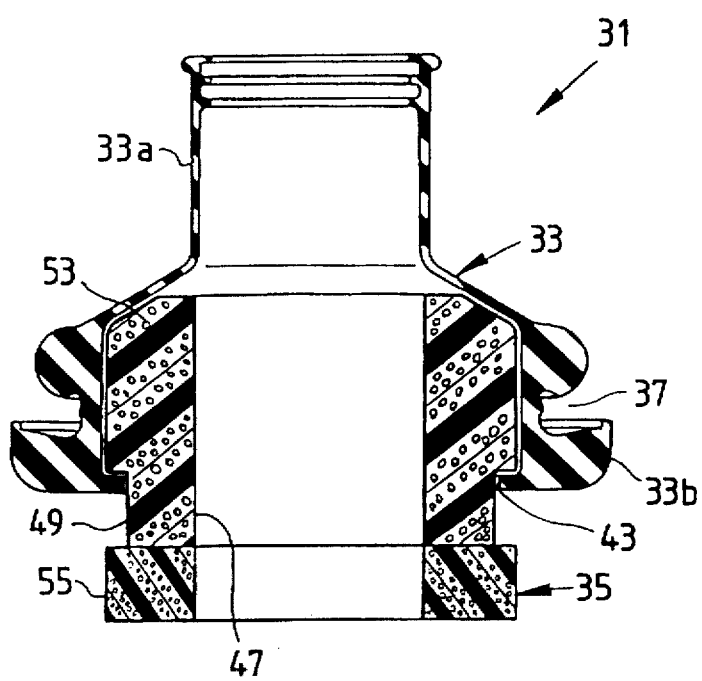
FIG. 2 is a sectional view of the silencer-equipped grommet of the invention.
Figure 3:
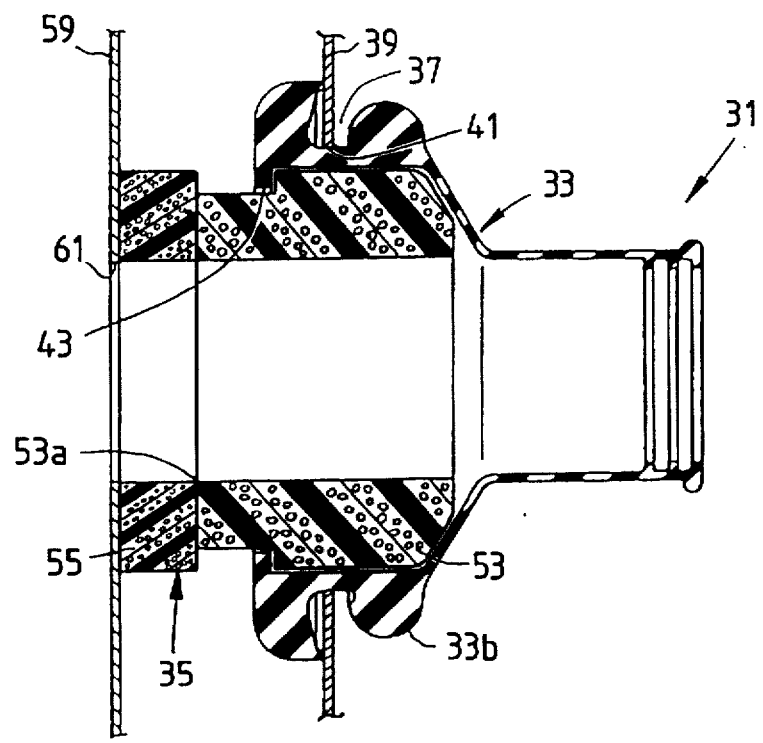
FIG. 3 is a sectional view showing a condition in which the silencer-equipped grommet of the invention is mounted on a motor vehicle.
Figure 4:
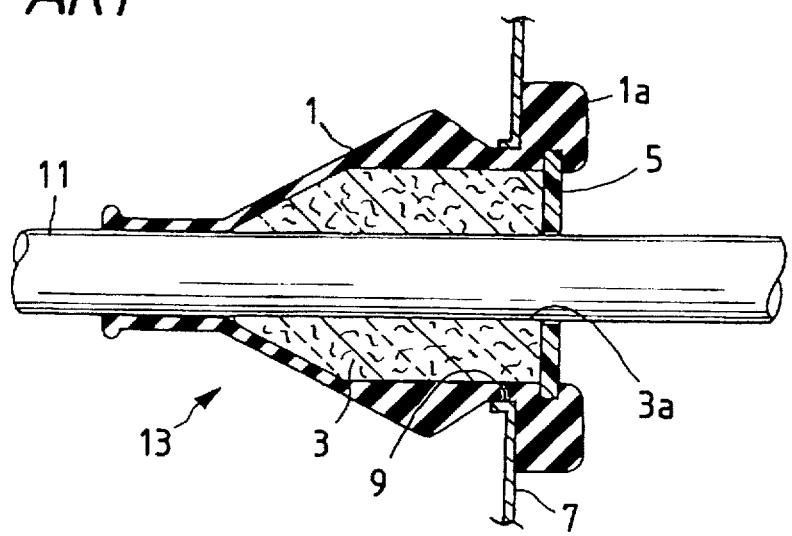
FIG. 4 is a sectional view showing a conventional acoustical insulation grommet having a noise insulating plate, which is disclosed in Unexamined Japanese Utility Model Publication No. Sho. 56-22718.
Figure 5:
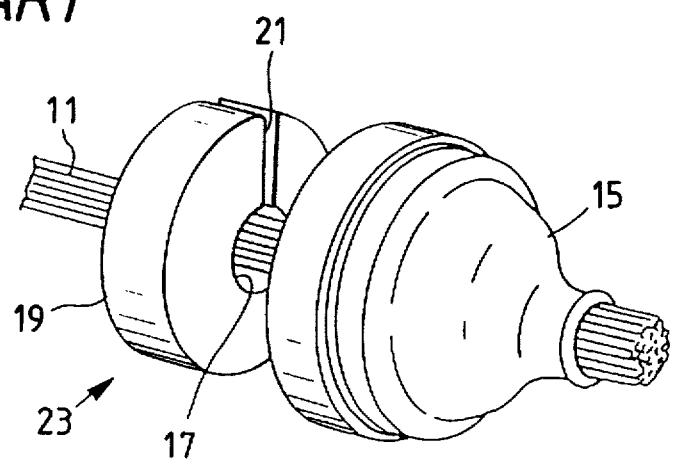
FIG. 5 is a sectional view showing a conventional soundproof grommet having a noise insulating member made of an elastic material, which is disclosed in Unexamined Japanese Utility Model Publication No. Sho. 57-15626.

A silencer-equipped grommet, which is a preferred embodiment of the invention, will be described in detail with reference to the drawings. FIG. 1 is an exploded perspective view of the silencer-equipped grommet of the invention; FIG. 2 is a sectional view of the silencer-equipped grommet of the invention; and FIG. 3 is a sectional view showing a condition in which the silencer-equipped grommet of the invention is mounted on a motor vehicle.

A silencer-equipped grommet 31 includes a grommet portion 33 and a silencer 35 engageable with the grommet portion 33.

The grommet portion 33 is made of an elastic material. More specifically, the grommet portion 33 is preferably made of rubber. The grommet portion 33 is funnel-shaped with a small diameter portion 33a and a large diameter portion 33b unitized with each other. The large diameter portion 33b is thick-walled compared with the small diameter portion 33a. A groove 37 is formed over the outer circumference of the large diameter portion 33b in the circumferential direction. As shown in FIG. 3, the groove 37 engages with the edge portion of a hole 41 formed in a dash panel 39. Therefore, the grommet portion 33 passes through and is held by the dash panel 39 while engaged with the edge portion of the hole 41.

An annular silencer-holding rib 43 extends along the edge portion on the inner circumferential side of the opening of the large diameter portion 33b. The rib 43 projects toward the central axis of the grommet portion 33 and extends in the inner circumferential direction.

On the other hand, the silencer 35 is formed to be cylindrical and has a wire insertion hole 47. An annular recess 49 for engaging with the rib 43 is formed over the outer circumference of the silencer 35. The wire insertion hole 47 of the silencer 35 is formed so that the inner diameter thereof is substantially the same as or slightly smaller than the outer diameter of a wire 45, which in turn allows the inner circumference of the wire insertion hole 47 to come in intimate contact with the outer circumference of the wire 45. Further, the silencer 35 opens the wire insertion hole 47 with a slit 51 that extends in a radial direction and along the length of the silencer 35. The slit 51 ensures excellent wire 45 inserting operability.

Only one end of the silencer 35 is inserted into the grommet portion 33 with the recess 49 interposed between the grommet portion 33 and the other end of the silencer 35. The outer diameter of such end is made to be slightly larger than the inner diameter of the grommet portion 33. Therefore, such end of the silencer 35 inserted and engaged with the grommet portion 33 can be attached to the grommet portion 33 with the outer circumference of such end being in intimate contact with the grommet portion 33. The silencer 35 whose one end has been inserted into the grommet portion 33 then has one of the steps of the recess 49 engaged with the silencer holding rib 43 of the grommet portion 33, so that the silencer 35 is prevented from separating from the grommet portion 33.

The silencer 35 is so designed that the recess 49 and the end thereof inserted into the grommet portion 33 constitute a noise insulating portion 53. The noise insulating portion 53 is made of a hard noise insulating material such as a hard foamed body having a great number of bubbles. More specifically, the noise insulating portion 53 is preferably made of foamed urethane.

On the other hand, the silencer 35 is so designed that the other end of the noise insulating portion 53, which projects from the grommet portion 33, constitutes a noise absorbing portion 55. The noise absorbing portion 55 is made of a soft noise absorbing material. More specifically, the noise absorbing portion 55 is preferably made of polyurethane foam.

The silencer 35 is structured in two layers by integrally forming two types of materials whose hardnesses are different.

An operation of the thus constructed silencer-equipped grommet 31 will now be described.

As shown in FIG. 3, the silencer-equipped grommet 31 passes through and is held by the dash panel 39 with the groove 37 on the outer circumference of the large diameter portion 33b engaged with the edge portion of the hole 41 with the noise insulating portion 53 of the silencer 35 inserted into the grommet portion 33.

Since the noise insulating portion 53 of the silencer 35 inserted into the grommet portion 33 is hard, it is ensured that the silencer holding rib 43 is reliably engaged with the recess 49. As a result, firm engagement can be provided, which minimizes the possibility of incomplete engagement during the silencer 35 engaging operation and increases holding force.

Further, since the noise insulating portion 53 that is made of a highly noise insulating material is inserted into the grommet portion 33, excellent noise insulating performance can be provided at the through portion of the hole which the grommet portion 33 passes through and is held by, and further, the noise insulating portion 53 is held so as to be in intimate contact with the inner wall of the grommet portion 33. Therefore, there is no room to allow noise to infiltrate between the grommet portion 33 and the silencer 35. Further, the noise absorbing portion 55 having excellent noise absorbing characteristics is provided on the end portion of the noise insulating portion 53. Therefore, any noise infiltrating from the noise insulating portion 53 is absorbed, thereby reliably preventing infiltration of noise into the motor vehicle.

According to the aforementioned silencer-equipped grommet 31, the noise insulating portion 53 that is hard and excellent in noise insulation and the noise absorbing portion 55 that is soft and excellent in noise absorption are integrally formed, and only the hard noise insulating portion 53 is held in the grommet portion 33 by engaging the silencer holding rib 43 with the recess 49. Therefore, excellent grommet portion 33 engaging operability can be provided, and incomplete engagement can be prevented. In addition, silencer 35 holding force can be increased.

Further, since the noise insulating portion 53 that is highly noise insulating is reliably inserted into the grommet portion 33 so as to be in intimate contact with the inner wall of the grommet portion 33, noise transmitted through the grommet portion 33 can be insulated, by high noise insulation. Further, since the noise absorbing portion 55 is unitized with the end portion of the noise insulating portion 53, any noise infiltrating from the noise insulating portion 53 can be absorbed, thereby reliably preventing infiltration of noise into the motor vehicle.

Since the soft noise absorbing portion 55 is unitized with the end portion of the noise insulating portion 53, even if the wire 45 is bent by an external force, the wire 45 is elastically held by the noise absorbing portion 55. As a result, the external force will not act directly on the hard noise insulating portion 53. Thus, the silencer 35 is unlikely to come off, and damage to the wire 45 due to the wire 45 directly rubbing against the corner 53a of the noise insulating portion 53 is prevented.

It may be noted that an insulator 59 (see FIG. 3) extending in parallel with the dash panel 39 is disposed on the passenger room side of the dash panel 39 so that noise infiltration from the engine room side can be doubly prevented.

If, the conventional acoustical insulation grommet is applied in the arrangement as shown in FIG. 3, a gap exists between the grommet held by the dash panel 39 and the insulator 59, thereby often producing noise due to the grommet being brought into contact with the insulator 59 by vibrations or the like of the motor vehicle.

If the silencer-equipped grommet 31 of the invention is applied to the arrangement as shown in FIG. 3, the noise absorbing portion 55 that is made of a soft material is arranged so as to project from the grommet portion 33. Therefore, the noise absorbing portion 55 can be brought into intimate contact with the insulator 59 at the same time with the grommet portion 33 passing through and being held by the dash panel 39.

Therefore, when the silencer-equipped grommet 31 is applied to the arrangement, the noise produced by the interference of the noise absorbing portion 55 with the insulator 59 can be prevented, and further, noise transmitted through a through hole 61 of the insulator 59 can be insulated, thereby providing double noise insulating structure.

As described in the foregoing in detail, according to the silencer-equipped grommet of the invention, the silencer is formed by unitizing the noise insulating portion made of a hard material and the noise absorbing portion made of a soft material, and only the hard noise insulating portion is inserted into the grommet portion. Therefore, excellent operability is provided for engaging the silencer with the grommet portion, and incomplete engagement can be prevented. In addition, silencer holding force can be increased. Further, Since the noise insulating portion having excellent noise insulating performance is inserted into the grommet portion, the noise transmitted through the noise insulating portion can be insulated by high noise insulation. Still further, since the noise absorbing portion is unitized with the end portion of the noise insulating portion, noise having infiltrated from the noise insulating portion can be absorbed, thereby allowing infiltrating noise to be reliably insulated.

Further, by slitting the silencer, the diameter of the wire insertion hole is made expandable, thereby allowing the operability for inserting the wire into the silencer to be improved.

Further, according to the silencer-equipped grommet mounting structure, the noise absorbing portion is brought into intimate contact with the insulator at the same time with the grommet portion passing through and being held by the panel. Therefore, the noise produced can be prevented in cooperation with the insulator, and further, the noise passing through the hole of the insulator can be insulated.

What is claimed is:

1. A grommet passable through and retainable by a hole formed in a panel, said grommet comprising:

a grommet portion made of an elastic material, said grommet portion having a large diameter portion having a rib portion and a small diameter portion, and said grommet portion having an opening penetrating said large diameter portion and said small diameter portion; and a silencer including:
a noise insulating portion made of a hard noise insulating material, a front end portion of said noise insulating portion insertable into said opening in said large diameter portion;
a recess portion, for engaging said rib portion, formed on said noise insulating portion;
a noise absorbing portion made of a soft noise absorbing material,
wherein said noise insulating portion and said noise absorbing portion are integrally formed; and
a wire insertion hole which penetrates said noise insulating portion and said noise absorbing portion.

2. The grommet of claim 1, further comprising a slit, for expanding said wire insertion hole, formed along a total length of said silencer.

3. The grommet of claim 1, wherein said noise absorbing portion projects from said grommet portion and is adapted to contact an insulator arranged in parallel with said panel when said grommet portion, into which said noise insulating portion is inserted, passes through and is held by said hole.

4. The grommet of claim 1, wherein said rib portion extends along an inner circumferential edge of said opening in said large diameter portion.

5. The grommet of claim 1, wherein said recess portion is formed over an outer circumference of said noise insulating portion.

6. The grommet of claim 1, wherein said grommet portion is made of rubber.

7. The grommet of claim 1, wherein said noise insulating portion is made of a hard foamed body.

8. The grommet of claim 7, wherein said noise insulating portion is made of foamed urethane.

9. The grommet of claim 1, wherein said noise absorbing portion is made of polyurethane foam.

10. The grommet of claim 1, wherein an outer diameter of said front end portion of said noise insulating portion is slightly larger than an inner diameter of said opening in said large diameter portion.

11. A silencer-equipped grommet passable through and retainable by a hole formed in a panel, comprising:

a grommet portion having a large diameter portion and a small diameter portion, passable through and retainable by the hole, said grommet portion being made of an elastic material;

a silencer having a noise insulating portion and a noise absorbing portion, and having a wire insertion hole formed so as to pass through said noise insulating portion and said noise absorbing portion, said noise insulating portion being insertable into said grommet portion, said noise insulating portion being made of a hard noise insulating material, and said noise absorbing portion being made of a soft noise absorbing material; and engaging means disposed on said grommet portion and said silencer for retainably engaging said noise insulating portion and said grommet portion when said noise insulating portion is inserted into said grommet portion.

12. The grommet of claim 11, further comprising a slit, for expanding said wire insertion hole, formed along a total length of said silencer.

13. The grommet of claim 11, wherein said noise absorbing portion projects from the grommet portion and is adapted to contact an insulator arranged in parallel with the panel when said grommet portion, into which said noise insulating portion is inserted, passes through and is held by said hole.

* * * * *